(12) United States Patent
Goto

(10) Patent No.: US 7,798,040 B2
(45) Date of Patent: Sep. 21, 2010

(54) CHIP REMOVING DEVICE OF BAND SAW MACHINE

(75) Inventor: Minoru Goto, Kanagawa (JP)

(73) Assignee: Amada Company, Limited, Kanagawa (JP)

( * ) Notice: Subject to any disclaimer, the term of this patent is extended or adjusted under 35 U.S.C. 154(b) by 206 days.

(21) Appl. No.: 10/598,465

(22) PCT Filed: Mar. 1, 2005

(86) PCT No.: PCT/JP2005/003370

§ 371 (c)(1),
(2), (4) Date: Oct. 17, 2006

(87) PCT Pub. No.: WO2005/082564

PCT Pub. Date: Sep. 9, 2005

(65) Prior Publication Data

US 2008/0017000 A1     Jan. 24, 2008

(30) Foreign Application Priority Data

Mar. 1, 2004    (JP) .............................. 2004-055990

(51) Int. Cl.
*B26D 7/18*    (2006.01)
(52) U.S. Cl. .............................. 83/168; 83/820; 83/101
(58) Field of Classification Search ................... 83/788, 83/820, 824, 826, 101, 168
See application file for complete search history.

(56) References Cited

U.S. PATENT DOCUMENTS 1,438,540 A * 12/1922 McKenna ..................... 83/168

(Continued)

FOREIGN PATENT DOCUMENTS

JP        5-104327        4/1993

(Continued)

OTHER PUBLICATIONS

Parmley, R. O. Editor. "Illustrated Sourcebook of Mechanical Components", Section 4 "Shafts and Couplings" by Robert O. Parmley. p. 4-6. © 2000 McGraw-Hill.Parmley, R.O. (2000). Illustrated Sourcebook of Mechanical Components. McGraw-Hill. Online version available at: http://knovel.com/web/portal/browse/display?_EXT_KNOVEL_DISPLAY_bookid=323&Vert.*

(Continued)

*Primary Examiner*—Kenneth E. Peterson
*Assistant Examiner*—Sean Michalski
(74) *Attorney, Agent, or Firm*—Greenblum & Bernstein P.L.C.

(57)    ABSTRACT

A chip removing device, in which a pair of brush support bodies include brushes 57 that can come into contact with both side surfaces of a band saw blade 23U, a rotation direction on a side where the pair of brushes come into contact with the band saw blade is inclined in a forward and downward direction with respect to a running direction of the band saw blade, the brush support body is provided such that it can rock in a direction approaching the band saw blade and in a direction separating away from the band saw blade, the chip removing device includes a biasing unit that can bias the brush support body in the direction approaching the band saw blade and in the direction separating away from the band saw blade, and the brush is rotated from the blade root side to the blade tip side of the band saw blade, thereby removing the chips.

3 Claims, 14 Drawing Sheets

U.S. PATENT DOCUMENTS

| | | | | |
|---|---|---|---|---|
| 1,453,335 | A | * | 5/1923 | Bennett ........................ 30/380 |
| 2,978,001 | A | * | 4/1961 | Whisler ........................ 83/168 |
| 3,485,123 | A | * | 12/1969 | Komendowski .............. 83/168 |
| 3,673,903 | A | * | 7/1972 | Evans ........................... 83/168 |
| 4,372,185 | A | * | 2/1983 | Pila .............................. 83/101 |
| 5,771,765 | A | * | 6/1998 | Aihara ......................... 83/168 |

FOREIGN PATENT DOCUMENTS

| | | |
|---|---|---|
| JP | 7-108415 | 4/1995 |
| JP | 2522423 | 10/1996 |
| JP | 2001-138131 | 5/2001 |

OTHER PUBLICATIONS

English Language Abstract of JP 2001-138131.
English Language Abstract of JP 5-104327.
English Language Abstract of JP 07-108415.

* cited by examiner

CHIP REMOVING DEVICE OF BAND SAW MACHINE

TECHNICAL FIELD

The present invention relates to a chip removing device in a band saw. More particularly, the invention relates to a chip removing device that removes chips adhered to a saw blade when the saw blade cuts a material to be cut, in a saw such as a lateral band saw, a vertical band saw, and a circular saw.

BACKGROUND ART

When a material is cut by a conventional lateral band saw that is one of the saws, chips are always generated. Some of the generated chips adhered to a gullet portion of the saw blade are transferred to a driving wheel and a follower wheel, and enter between the saw blade and the wheels, thereby damaging the saw blade and the wheels or making the saw blade slip. Therefore, it is necessary to remove the chips adhered to the saw blade.

Various devices are conventionally proposed as a chip removing device that removes chips adhered to the saw blade. As one example of a general chip removing device in a lateral band saw, there is a chip removing device in which a saw blade housing is provided with a band saw blade such that the band saw blade can run, the saw blade housing is provided with a brush support member that rotatably supports a brush for removing chips adhered to the saw blade, a stopper member against which the brush can abut is provided at a position near the saw blade, the brush support member can move toward and away from the stopper member, the chip removing device has a biasing unit including a spring that biases the brush in a direction in which the brush abuts against the stopper member, and the chip removing device includes a fixing unit that fixes the brush support member when the saw blade enters with respect to tips of bristles of the brush by a predetermined amount. For example, a device disclosed in Japanese Patent Application Laid-Open No. H7-108415 corresponds to the above device.

The chip removing device requires the stopper member that positions the brush, and the fixing unit having a complicated configuration including a lock cylinder that is a unit that fixes the brush support member. Further, since the brush is always pushed and biased against the saw blade by the spring, it is necessary to retract the brush to a position where it does not interfere replacement of the saw blades when saw blades are replaced, and to fix the brush at that position by the fixing unit. There is a problem that since there is one brush, chips remain on a side on which the brush does not come into contact.

The present invention has been achieved to solve the above problem, and it is an object of the invention to provide a chip removing device in a band saw having excellent chip removing ability that does not require a stopper member for positioning a brush at a chip removing position, and a fixing unit that holds the brush at a retracting position, and that can reduce the remainder of chips.

DISCLOSURE OF THE INVENTION

To achieve the above object, a first aspect of the present invention provides a chip removing device in a band saw that removes, using a brush, chips adhered to a band saw blade that rotates while being wound around a driving wheel and a follower wheel rotatably supported by a saw blade housing, the chip removing device including: a pair of brush support bodies that pivotally support a brush shaft having a brush that can come into contact with both side surfaces of a blade tip of the band saw blade such that the brush shaft can rotate and drive; a rotating and driving mechanism that simultaneously rotates and drives the pair of brush shafts pivotally supported by the pair of brush support bodies; and a removing biasing unit that can bias the bush support bodies in a direction approaching the band saw blade and in a direction separating away from the band saw blade, wherein the brush support body and the brush shaft are provided such that they can rock in the direction approaching the band saw blade and in the direction separating away from the band saw blade, and the brush is sandwiched with substantially constant pressing force with respect to the band saw blade.

A second aspect of the present invention provides the chip removing device in the band saw according to the first aspect, further including a wear detector that detects a reduction in diameter of the brush caused by wear as a variation of the brush support body in a direction approaching the band saw blade.

A third aspect of the present invention provides the chip removing device in the band saw according to the first or the second aspect, wherein the wear detector includes: pushing levers extending from the pair of brush support bodies toward the band saw blade; shafts to be detected that are engaged with the pushing levers and that can reciprocate in parallel to the brush shaft; and a detecting biasing unit that always brings the to-be detected shafts into abutment against the pushing levers, the wear detector detects movement of one or both of the to-be detected shafts and detects wear of the brush.

A fourth aspect of the present invention provides the chip removing device in the band saw according to any one of the first to the third aspects, wherein a rotation direction on a side where the pair of brushes provided on the pair of the brush shafts come into contact with the band saw blade is inclined in a forward and downward direction with respect to a running direction of the band saw blade, and the brush is rotated from a blade root side toward a blade tip side of the band saw blade, thereby removing the chips from the band saw blade.

A fifth aspect of the present invention provides the chip removing device in the band saw according to any one of the first to the fourth aspects, wherein the rotating and driving mechanism includes: a pair of rive bevel gears opposed to a shaft end of a main rotation drive shaft that is rotated and driven by a drive motor; a pair of second rotation drive shafts that are rotated and driven in directions opposite from each other through a pair of follower bevel gears meshing with the pair of drive bevel gears, the pair of second rotation drive shafts intersecting with the main rotation drive shaft at right angles; and a universal joint that connects the pair of second rotation drive shafts and the pair of brush shafts that are pivotally supported by the pair of brush support bodies such that the pair of second rotation drive shafts and the pair of brush shafts can rock in a direction approaching the band saw blade and in a direction separating away from the band saw blade.

A sixth aspect of the present invention provides the chip removing device in the band saw according to any one of the first to the fifth aspects, wherein the removing biasing unit includes: spring hooks that are respectively provided on the brush support bodies and a housing incorporating the main rotation drive shafts and the second rotation drive shaft on the side of the band saw blade, and at positions away from a turning center of the universal joint; and tension springs that are resiliently provided between the spring hook on the side of the housing and the spring hook on the side of the brush support body.

According to the chip removing device in the band saw based on the first to the sixth aspects of the invention, the pair of brushes are sandwiched from both sides of the band saw blade with substantially constant pressing force, and the brush is brought into contact and rotated from the blade root side toward the blade tip side. With this, it is possible to effectively remove chips adhered to a gullet portion of the band saw blade. A stopper member that positions the brush at a chip removing position and a fixing unit that holds the brush at a retracting position are not required.

When one or both of the brushes are worn to their using limit, this is detected as a variation in a direction where the brush support body approaches the band saw blade by the reduction in the diameter of the brush, and the wear of the brush can be detected.

BEST MODE(S) FOR CARRYING OUT THE INVENTION

Embodiments of the present invention will be explained with reference to the drawings.

Figure 1:
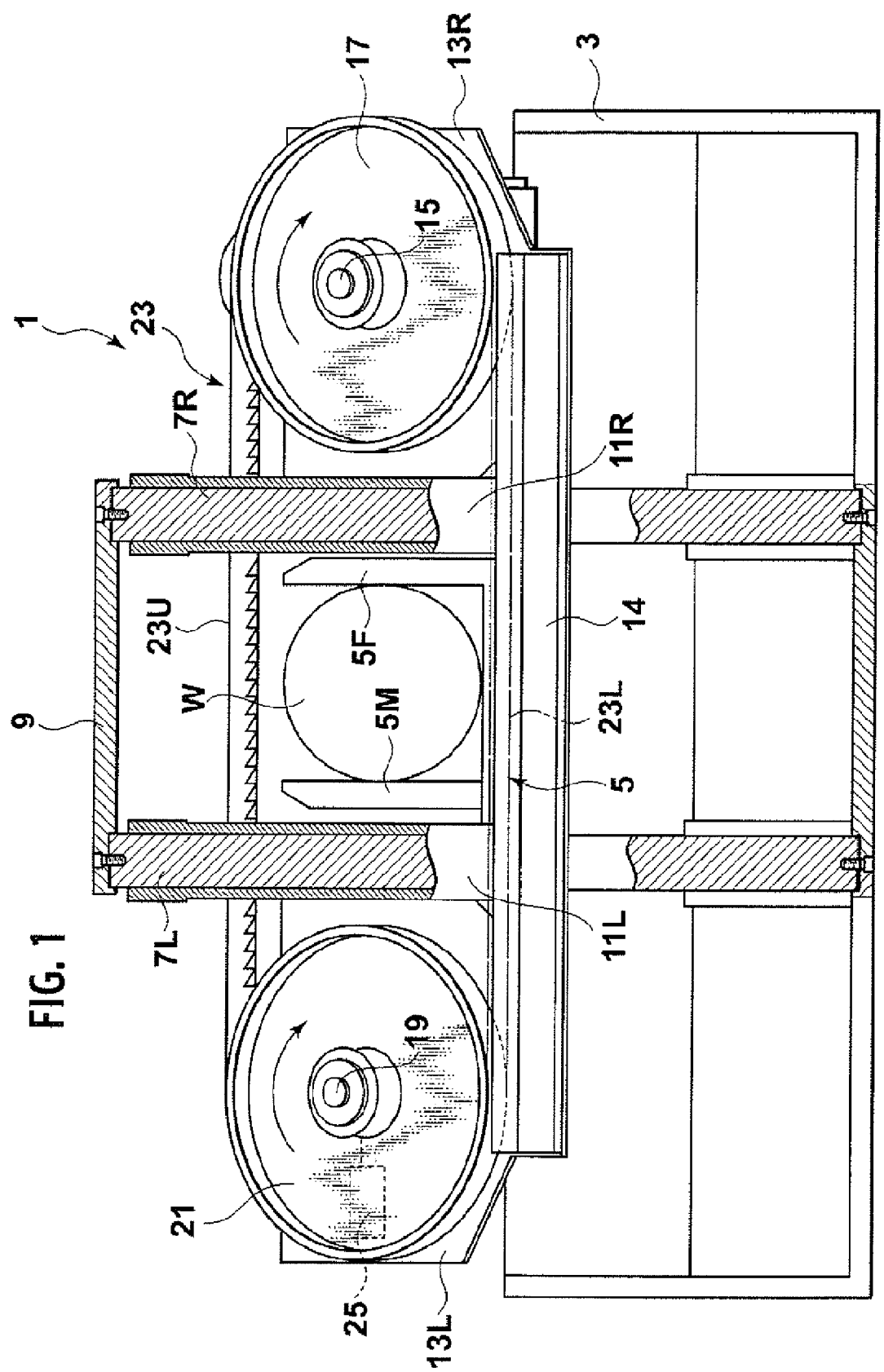
FIG. 1 is a conceptional and schematic front explanatory diagram of a lateral band saw according to an embodiment of the present invention.

FIG. 1 shows a lateral band saw 1 having a chip removing device in a band saw according to the present invention as one example of a saw.

The lateral band saw 1 includes a box-like base frame 3. The base frame 3 includes, at its upper surface, a to-be cut material bringing stage (not shown) for bringing a to-be cut material W from a back side of a paper sheet into the lateral band saw 1, and a later-described product receiving stage 29 (see FIG. 3) for supporting a product that is cut by the lateral band saw 1.

The to-be cut material bringing stage (not shown) includes a vise device 5 including a fixed vise jaw 5F and a moving vise jaw 5M that can sandwich the to-be cut material W and that are opposed to each other. Since the vise device 5 is of a general and well known configuration, detailed explanation of the vise device 5 will be omitted.

A pair of left and right guide posts 7L and 7R stand from the base frame 3. Upper ends of the guide posts 7L and 7R are integrally connected to each other through a connection member 9 to enhance the strength and to maintain the parallelism of the guide posts 7L and 7R. Cylindrical slide sleeves 11L and 11R are vertically movably fitted into the left and right guide posts 7L and 7R, and left and right wheel brackets 13L and 13R are integrally fixed to the left and right outer sides of the left and right slide sleeves 11L and 11R by welding or the like.

The left and right wheel brackets 13L and 13R are inclined such that their upper portion come to a rear side (upper portions come to a back side in FIG. 1). Lower portions of the slide sleeves 11L and 11R and lower portions of the left and right wheel brackets 13L and 13R are integrally connected to a beam member 14 that is long in a lateral direction. The beam member 14 and the left and right wheel brackets 13L and 13R constitute a saw blade housing that rotatably supports a driving wheel and a follower wheel to be described later. The beam member 14 and the wheel brackets 13L and 13R are formed into a C-shape whose upper sides are opened, and their heights can be suppressed.

The wheel bracket 13R has a double structure having an upper bracket 13A and a lower bracket 13B. A driving wheel 17 is rotatably supported between the upper and lower brackets 13A and 13B through a rotation shaft 15 whose opposite ends are supported by the upper and lower brackets 13A and 13B, respectively. The driving wheel 17 is rotated by a motor M (see FIGS. 3 and 4) mounted on the wheel bracket 13R.

A follower wheel 21 is rotatably supported on the left wheel bracket 13L through a rotation shaft 19. An annular band saw blade 23 is wound around the follower wheel 21 and the driving wheel 17. A tension applying unit 25 that moves the follower wheel 21 toward and away from the driving wheel 17 and that applies tension to the annular band saw blade 23 is mounted on the wheel bracket 13L.

The tension applying unit 25 moves a support block (not shown), which supports the rotation shaft 19, toward and away from the driving wheel 17, thereby applying tension to the band saw blade 23. For example, the tension applying unit 25 is a hydraulic cylinder or a screw mechanism. Since the tension applying unit 25 of this kind is well known, further detailed explanation of the tension applying unit 25 will be omitted.

A vertically moving actuator 27 (see FIG. 2) such as a hydraulic cylinder is provided to vertically move the saw blade housing. A piston rod 27P of the vertically moving actuator 27 is connected to a portion of the base frame 3. A cylinder body is integrally connected to the slide sleeve 11R (the details of the connecting configuration are not illustrated). The actuator that vertically moves the saw blade housing is not limited to the hydraulic cylinder, and a ball screw mechanism that is rotated by a motor can be also employed.

Figure 2:
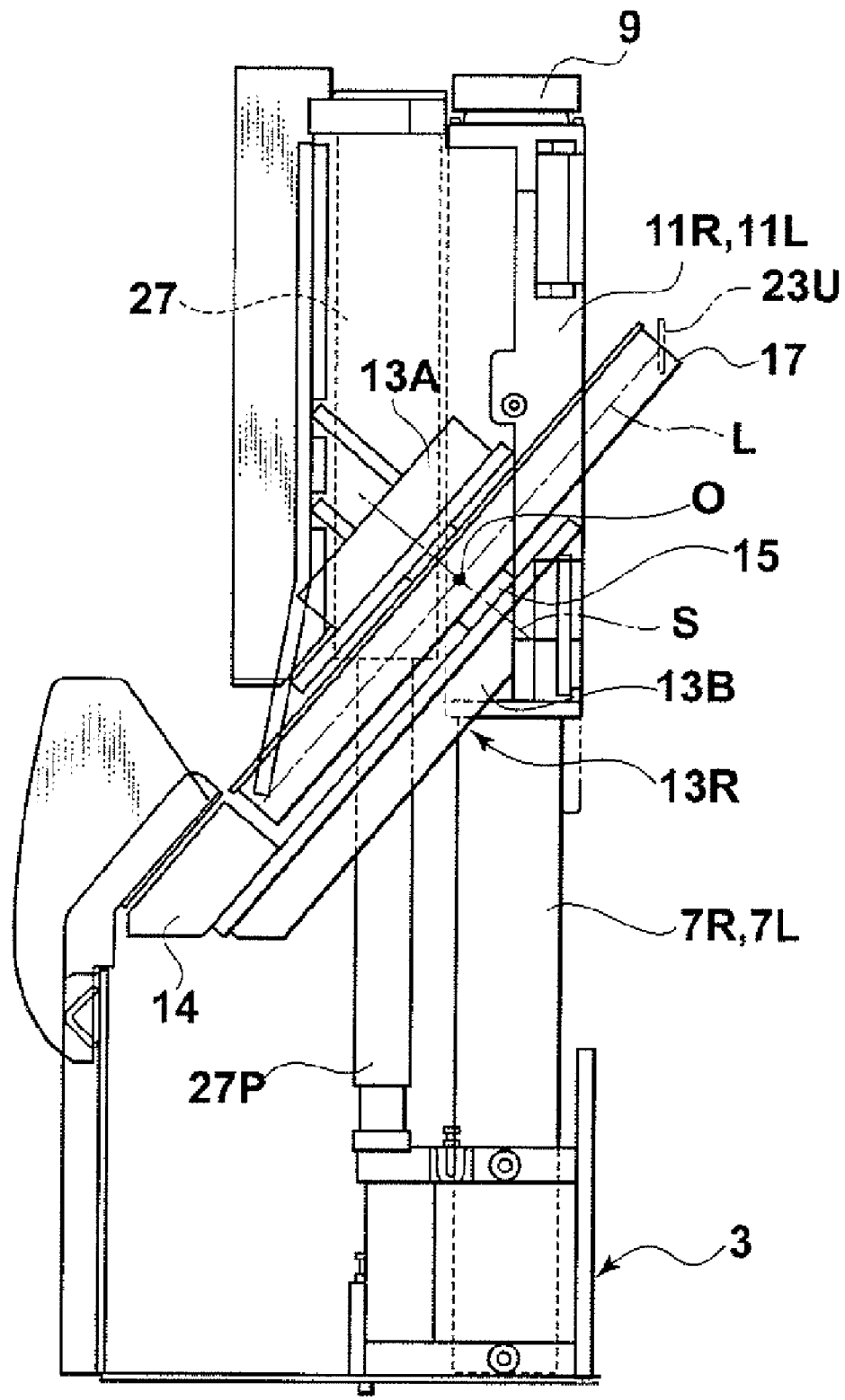
FIG. 2 is a conceptional and schematic front explanatory diagram of a right side view of FIG. 1.

As shown in FIG. 2, the driving wheel 17 and the follower wheel 21 are inclined in the longitudinal direction such that upper portions of the driving wheel 17 and the follower wheel 21 are located on the rear side (right side in FIG. 2) from the guide posts 7L and 7R, and lower portions of the driving wheel 17 and the follower wheel 21 are located on the front side (left side in FIG. 2) from the guide posts 7L and 7R as viewed from a side in the lateral direction.

Intersections O between shafts S of the driving wheel 17 and the follower wheel 21 and center lines L of the wheels 17 and 21 in the widthwise direction as viewed from the side are located at positions that are substantially equal to the widths of the guide posts 7L and 7R in the longitudinal direction or located within the width as viewed from the side.

Therefore, a straight upper running portion 23U of the annular band saw blade 23 wound around the driving wheel 17 and the follower wheel 21 is located on the rear side of the pair of guide posts 7L and 7R, and a straight lower running portion 23L of the annular band saw blade 23 is located on the front side of the guide posts 7L and 7R. To cut the to-be cut material W by the upper running portion 23U, the saw blade housing includes a moving saw blade guide (not shown) and a stationary saw blade guide 24 (see FIGS. 3 and 5) for twisting the to-be cut material W such that a tip of the saw blade of the upper running portion 23U is oriented vertically downward. Even when the saw blade housing is lifted to the uppermost position, the lower running portion 23L of the annular band saw blade 23 is located lower than a support surface of the to-be cut material of the vise device 5.

To deviate clearances between the guide posts 7L and 7R and the slide sleeves 11L and 11R to one direction, i.e., to bring a clearance of the guide posts 7L and 7R on the rear side (right side in FIG. 2) on the upper sides of the slide sleeves 11L and 11R and a clearance of the guide posts 7L and 7R on the front side (left side in FIG. 2) on the lower sides of the slide sleeves 11L and 11R to zero, a barycenter of the saw blade housing is provided on the front side (diagonally lower side) of the saw blade housing.

With the above configuration, the driving wheel 17 is rotated and the saw blade housing is descended, thereby cutting a workpiece W sandwiched and fixed by the vise device 5 by the running portion 23U.

To cut the workpiece W, as described above, if the tension applying unit 25 moves the follower wheel 21 away from the driving wheel 17 to apply great tension to the band saw blade 23, its reaction force is received by the left and right guide posts 7L and 7R through the left and right wheel brackets 13L and 13R and the left and right slide sleeves 11L and 11R.

Therefore, the tension of the band saw blade 23 can be greatly increased as compared with the conventional configuration, cut bending at the time of a high speed heavy cutting operation can be suppressed, and a heavy cutting operation can precisely and efficiently be carried out. In other words, with the above configuration, a configuration of the saw blade housing that supports the driving wheel 17 and the follower wheel 21 can be simplified and reduced in weight and its rigidity can be enhanced.

The barycenter is provided on the front side of the saw blade housing, and the clearances between the rear sides of the upper portions of the guide posts 7L and 7R and the rear sides of the upper portions of the slide sleeves 11L and 11R are brought and kept at zero. Therefore, when the upper running portion 23U of the annular band saw blade 23 comes into contact with the workpiece W and the cutting operation of the workpiece W is started, the slide sleeves 11L and 11R can vertically smoothly slide with respect to the guide posts 7L and 7R without generating impact due to existence of the clearances between the guide posts 7L and 7R and the slide sleeves 11L and 11R.

Figure 3:
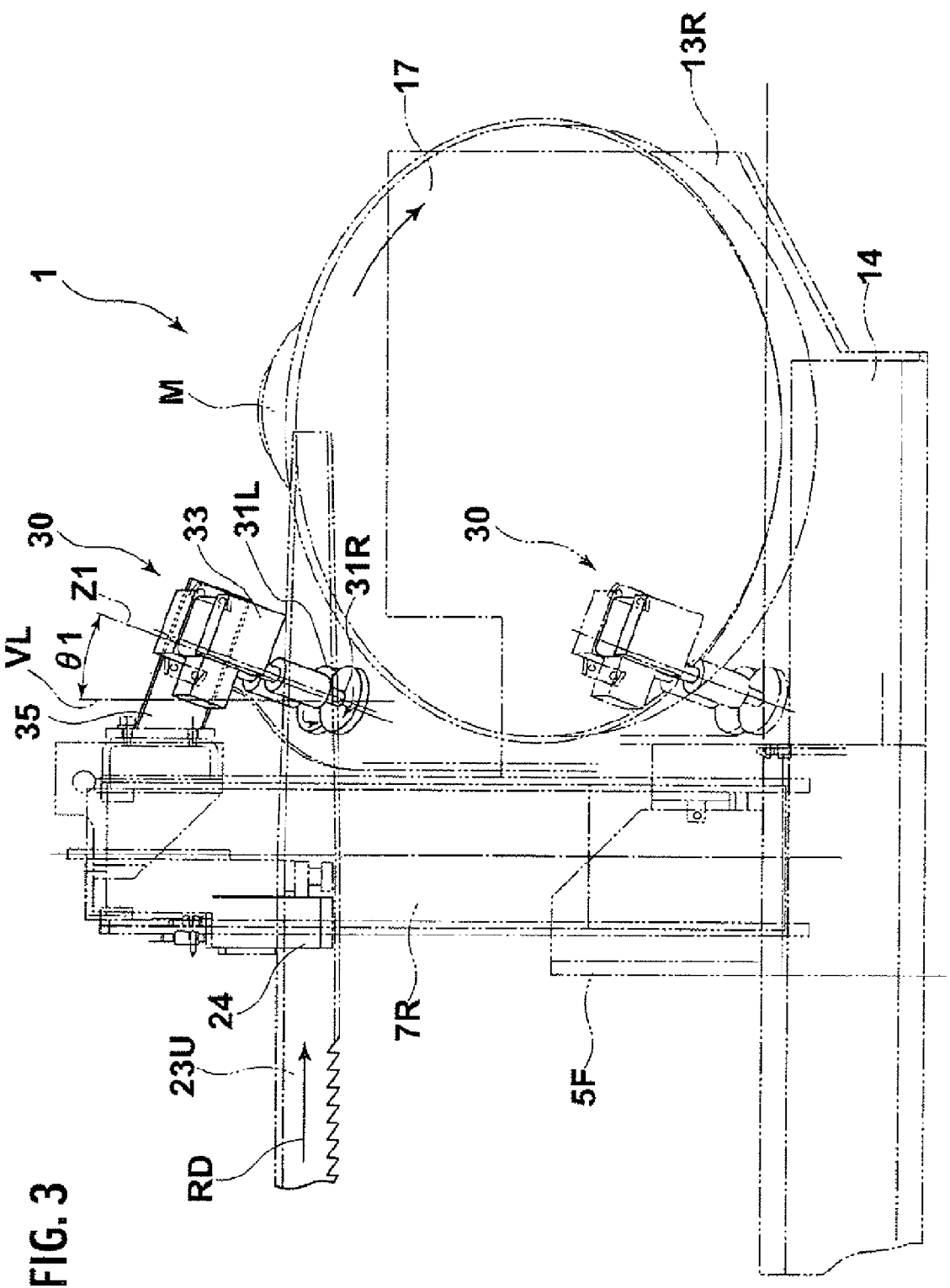
FIG. 3 is an enlarged explanatory diagram of relevant parts of the present invention in FIG. 1.
Figure 4:
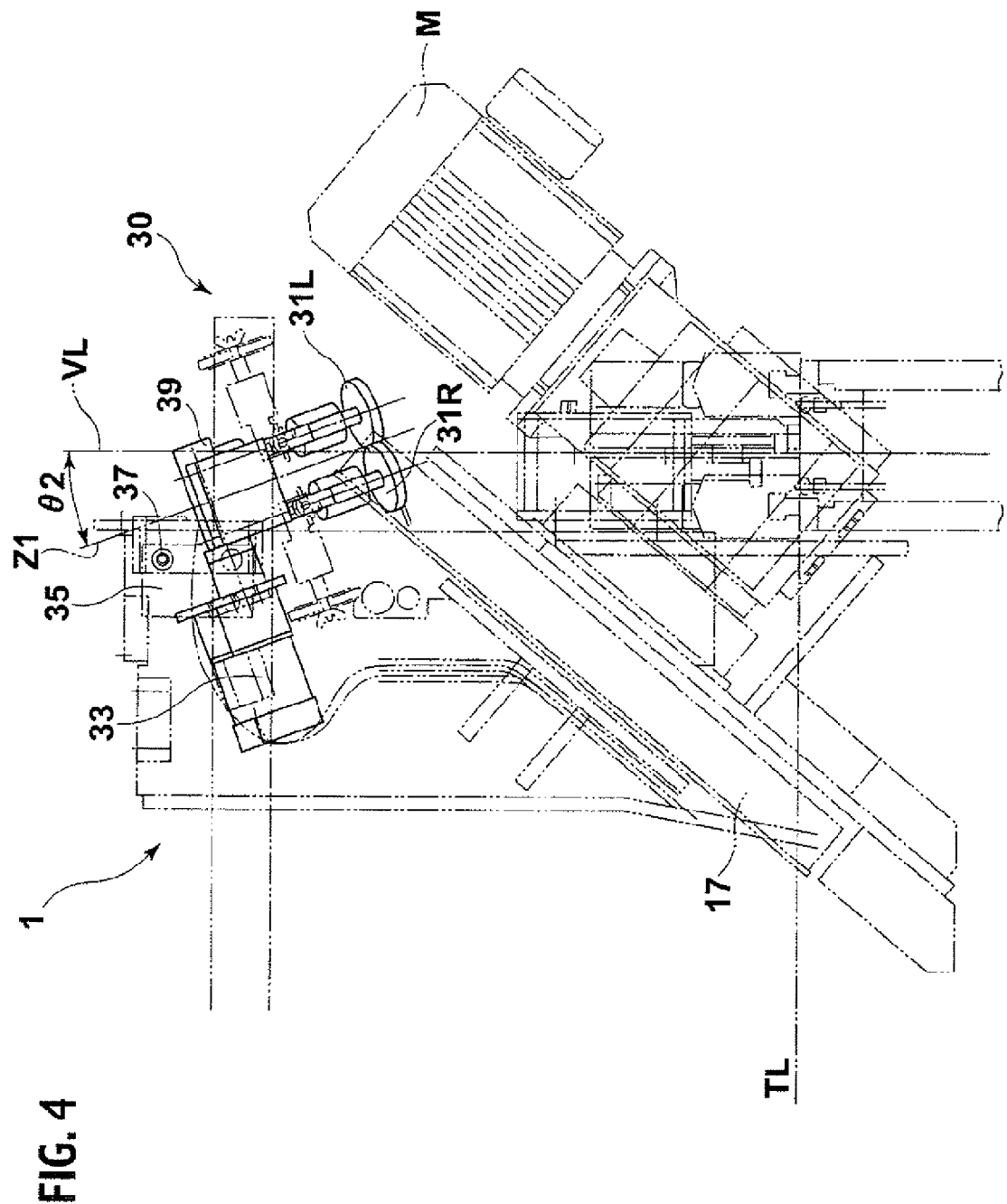
FIG. 4 is a right side view of FIG. 3.

FIGS. 3 and 4 show a mounting position of a chip removing device 30 that is a relevant portion of the present invention. As clearly shown in FIG. 3, the chip removing device 30 is located at a substantially intermediate portion between the driving wheel 17 and the stationary saw blade guide 24 provided on the upper running portion 23U of the annular band saw blade 23, and the chip removing device 30 is fixed to the saw blade housing together with the saw blade guide 24. The saw blade guide 24 is disposed at a location above and slightly rightward of the fixed vise jaw 5F (see FIGS. 3 and 5).

The chip removing device 30 includes brushes 31 (L and R) such as a pair of wire brushes that can sandwich both sides of a blade tip of the upper running portion 23U of the annular band saw blade 23. The brushes 31 (L and R) are rotated in the opposite directions from each other by a brush-driving geared motor 33.

Figure 5:
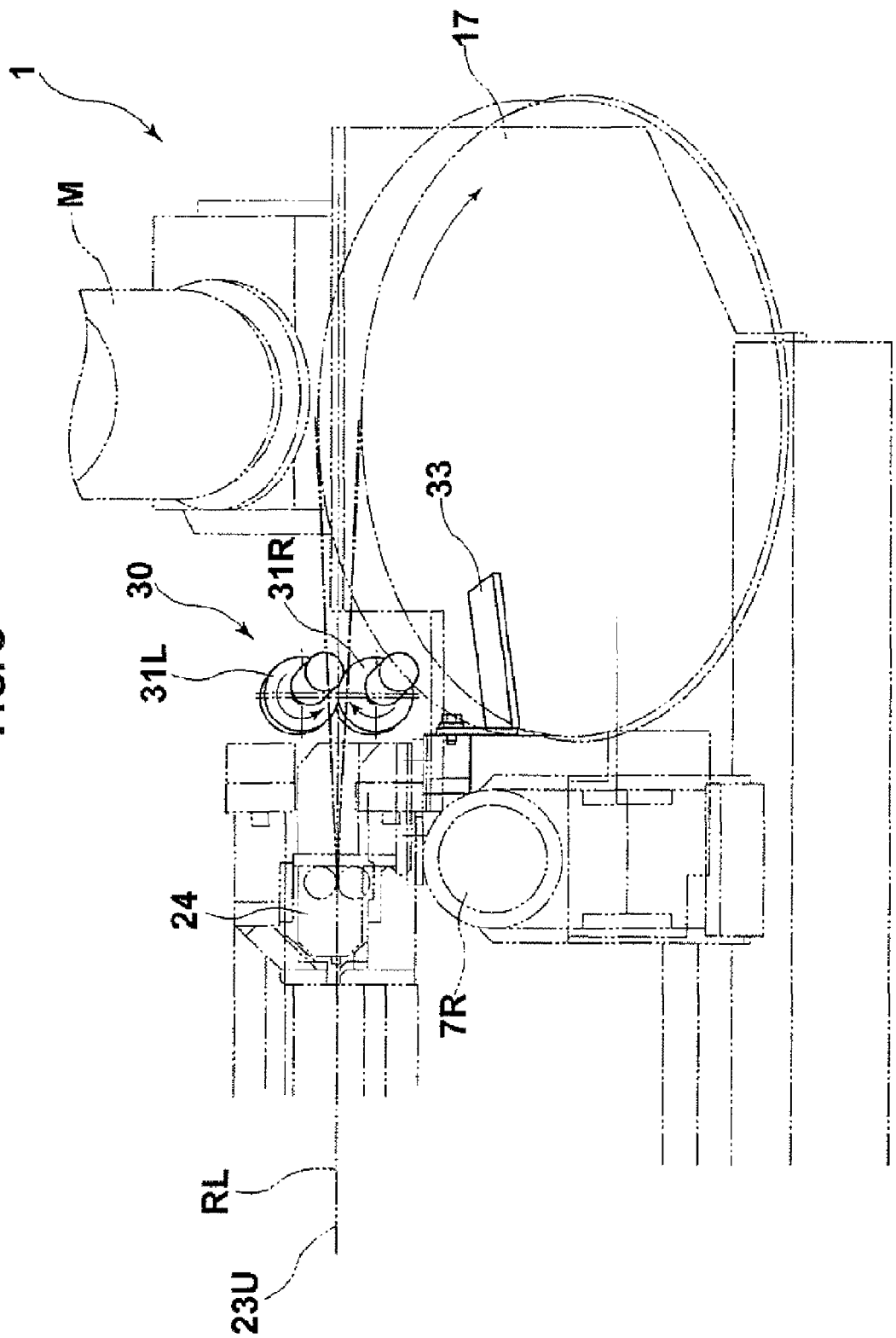
FIG. 5 is a plan view of FIG. 3.
Figure 6:
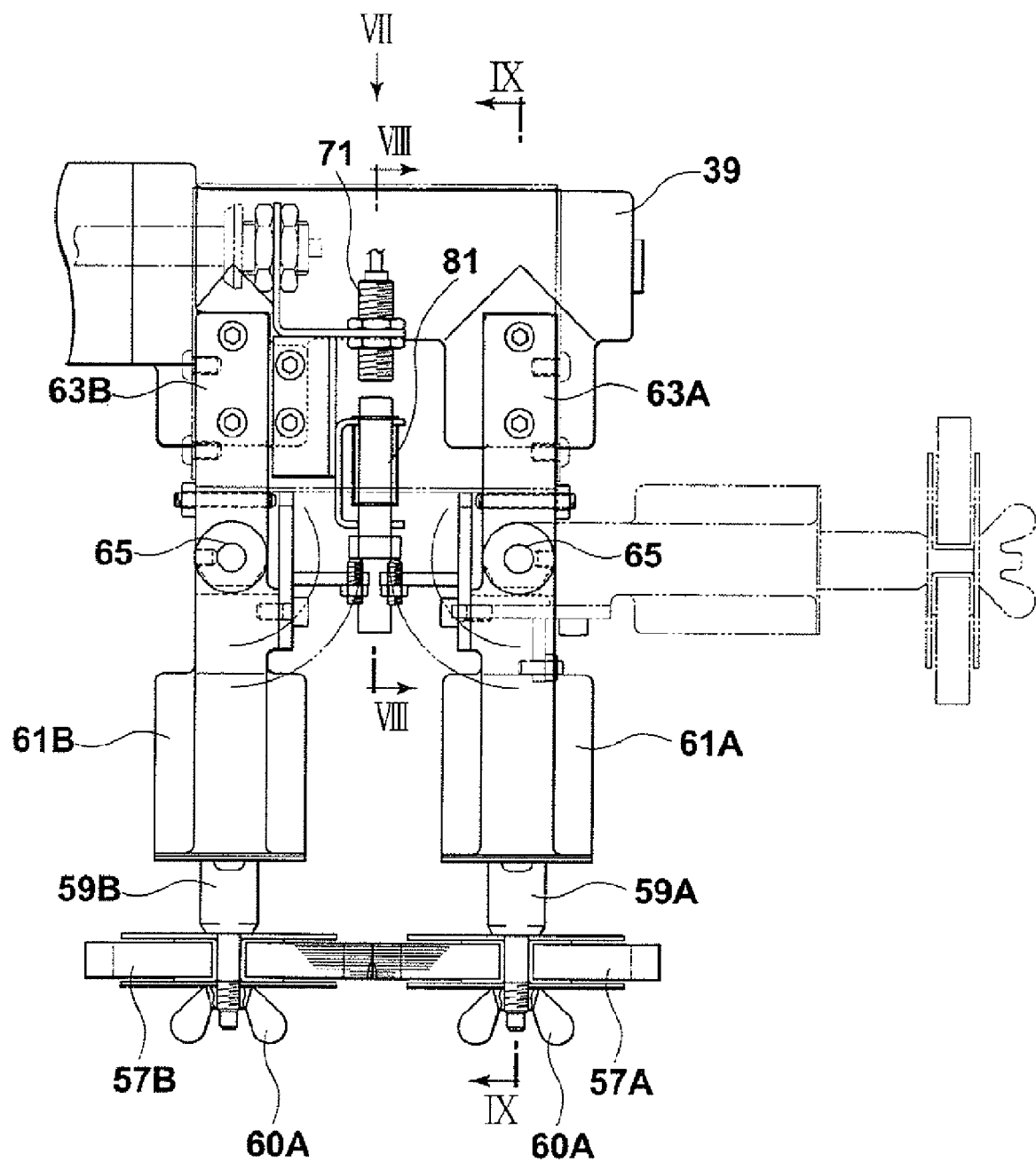
FIG. 6 is an explanatory diagram of relevant parts shown in FIG. 4.
Figure 7:
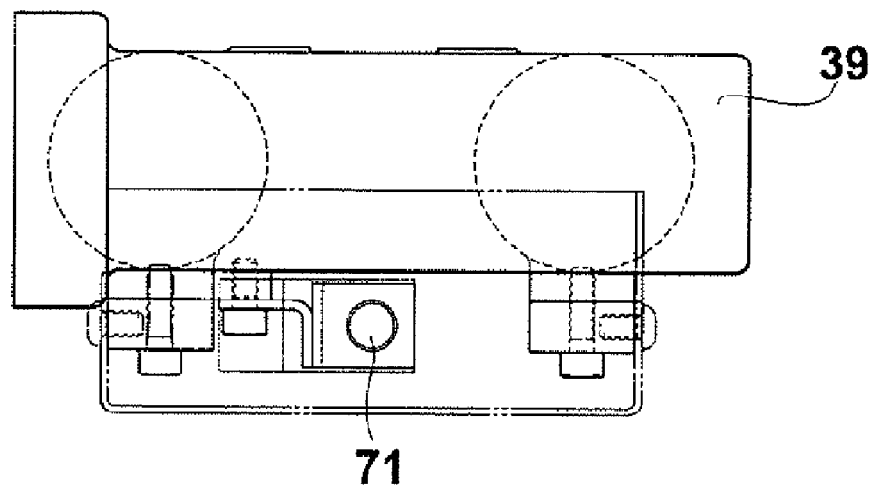
FIG. 7 is a diagram taken along an arrow VII in FIG. 6.
Figure 8:
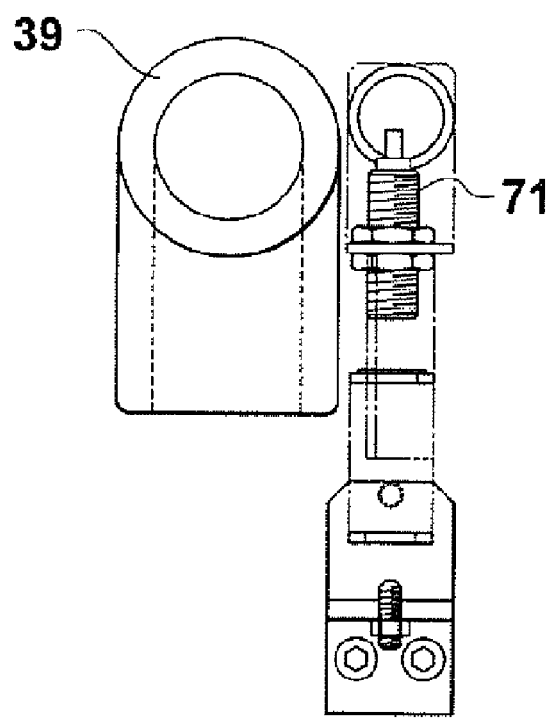
FIG. 8 is a cross section taken along a line VIII-VIII in FIG. 6.
Figure 9:
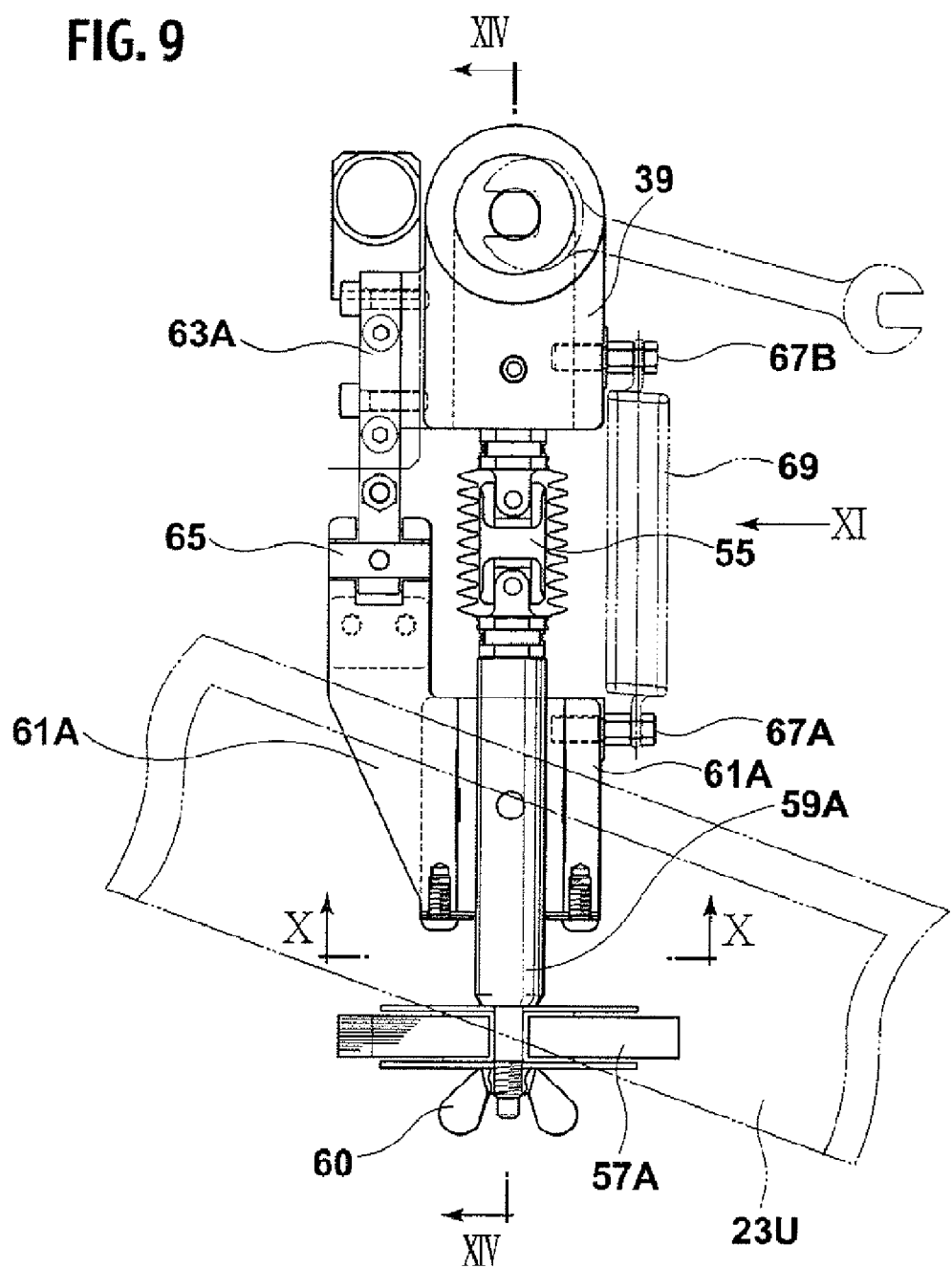
FIG. 9 is a cross section taken along a line IX-IX in FIG. 6.
Figure 10:
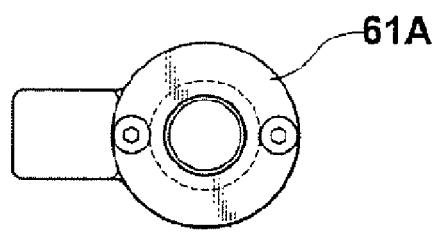
FIG. 10 is a cross section taken along a line X-X in FIG. 9.

The rotation direction in which the pair of brushes 31 (L and R) come into contact with the upper running portion 23U of the annular band saw blade 23 is set such that the rotation direction is inclined in the forward and downward directions through about 20° with respect to a running direction RD of the upper running portion 23U (see FIGS. 3 and 5). In FIG. 5, a reference symbol RL represents a running line of the saw blade.

That is, brush shafts Z1 of the brushes 31 (L and R) are inclined from a vertical (perpendicular) direction VL toward the running direction of the upper running portion 23U of the annular band saw blade 23 through an angle θ1 (0° to about 20°) (FIG. 3). The brush shafts Z1 are inclined from the vertical direction VL toward the longitudinal direction through an angle θ2 (0° to about 20°) (see FIG. 4) according to a twisting angle of the saw blade of the upper running portion 23U between the saw blade guide 24 and the driving wheel 17.

It is preferable that the angle θ1 and the angle θ2 can freely be changed according to the twisting angle of the saw blade caused by a rake angle and a relief angle of the blade of the saw blade and the mounting position of the chip removing device.

The chip removing device 30 is mounted on the saw blade housing through a motor housing 35 on which the geared motor 33 that drives the brushes 31 (L and R) is mounted.

With this configuration, the brushes 31 (L and R) are brought into contact and are rotated from a blade tip side toward a blade root side of the band saw blade, and chips adhered to the gullet portion of the saw blade can effectively be removed.

Figure 14:
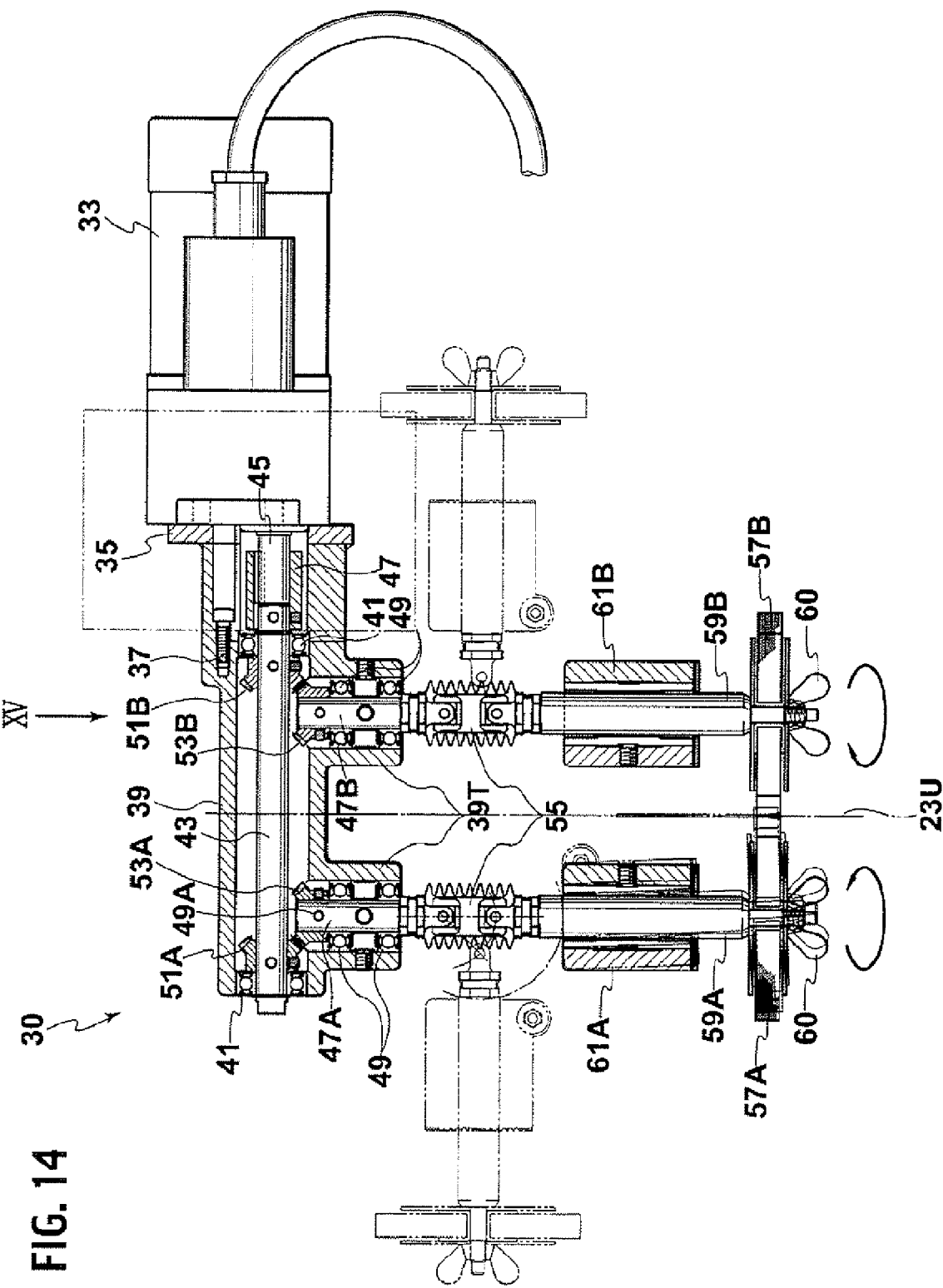
FIG. 14 is a cross section taken along a line XIV-XIV in FIG. 9.
Figure 15:
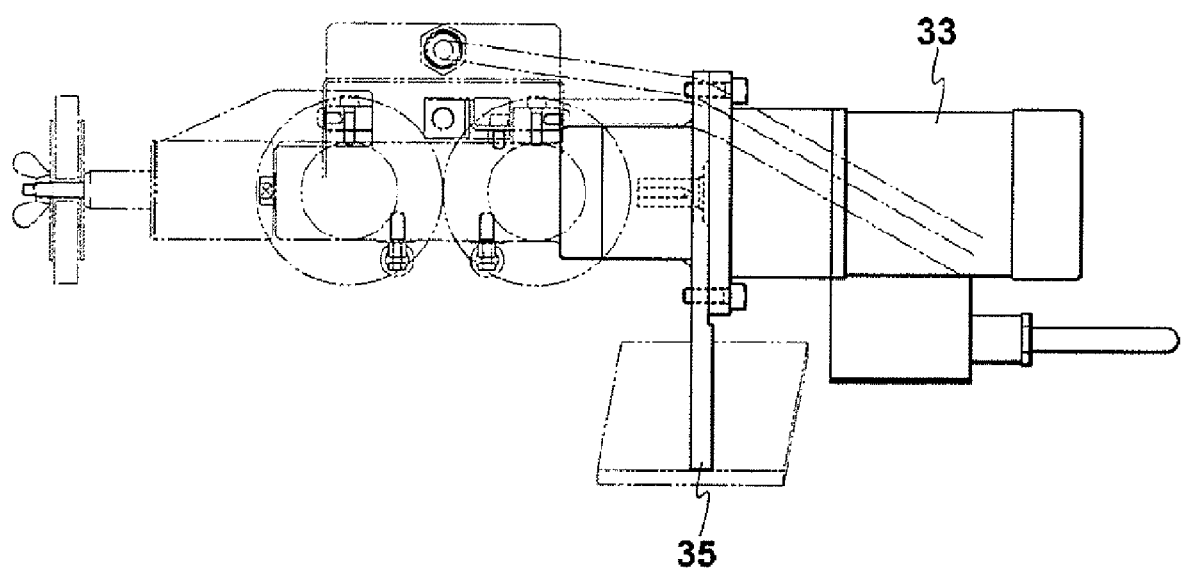
FIG. 15 is a diagram taken along an arrow XV in FIG. 14.
Figure 16:
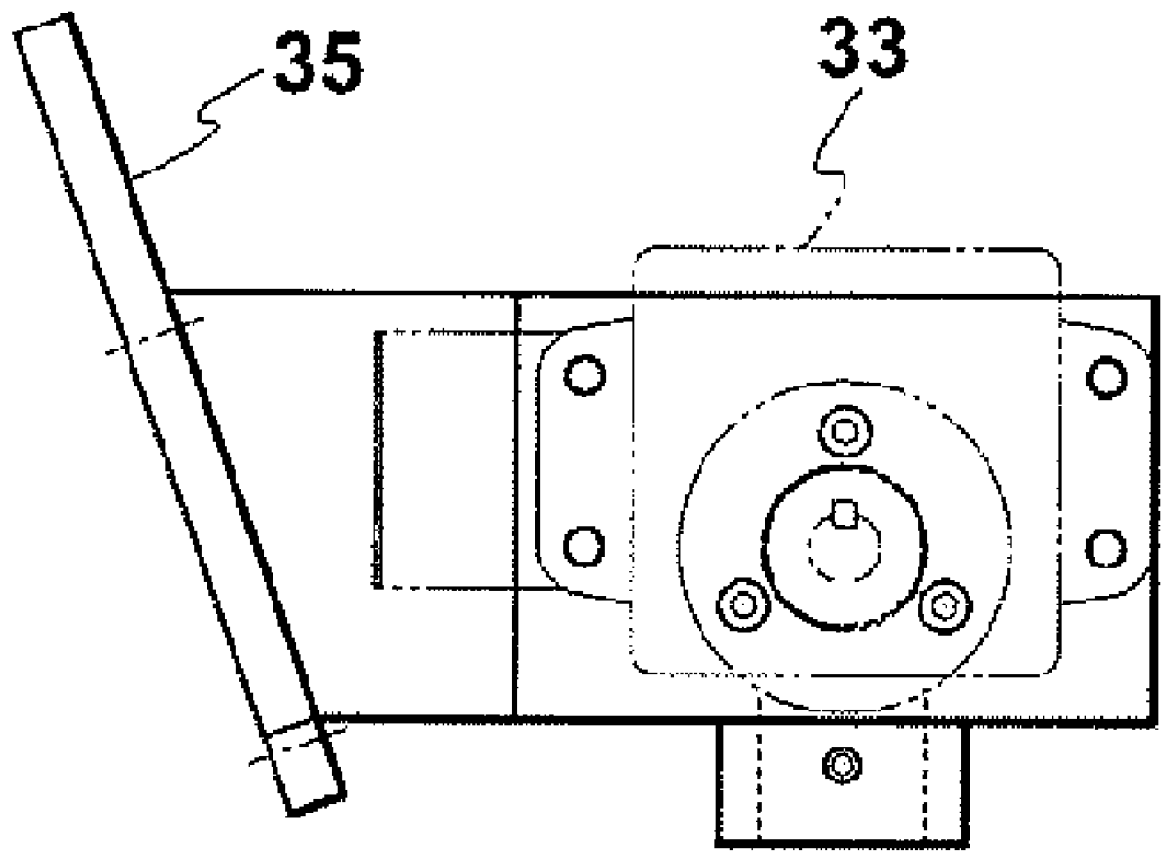
FIG. 16 is a right side view of FIG. 14.

With reference to FIGS. 6 to 16, the chip removing device 30 includes a housing 39 (FIG. 4) that is integrally coupled to a motor housing 35 through a plurality of bolts 37. As shown in FIG. 14, the housing 39 includes a main rotation drive shaft 43, both ends of which are rotatably supported by bearings 41. One end of the main rotation drive shaft 43 is coupled to an output shaft 45 of the geared motor 33 through a coupling 47.

The housing 39 is formed with a pair of projections 39T that extend in a direction perpendicular to the main rotation drive shaft 43. Second rotation drive shafts 47 (A and B) that extend in parallel to the direction intersecting with the main rotation drive shaft 43 at right angles are rotatably supported in the pair of projections 39T by bearings 49.

A pair of mutually opposed drive bevel gears 51 (A and B) are mounted on both ends of the main rotation drive shaft 43. Ends of the second rotation drive shafts 47 (A and B) on the side of the main rotation drive shaft 43 include follower bevel gears 53 (A and B) that mesh with the drive bevel gears 51.

The other ends of the brush shafts 59 (A and B) provided at their tip ends with detachable brushes 57 (A and B) are connected to the other ends of the second rotation drive shafts 47 (A and B) through universal joints 55 such that the other ends of the brush shafts 59 (A and B) can turn in a range of about 90° which is a bendable range of the universal joints 55. The brushes 57 (A and B) are fixed to tip ends of the brush shafts 59 (A and B) by butterfly nuts 60.

As clearly shown in FIGS. 6, 9, 11, and 14, the brush shafts 59 (A and B) are rotatably supported by brush support bodies 61 (A and B). The brush support bodies 61 (A and B) are coupled to hinge plates 63 (A and B) that are mounted on one side surface of the housing 39 (left side in FIG. 9) through hinge pins 65 such that the brush support bodies 61 (A and B)

can turn in a range of about 90°. A position of each of the hinge pins 65 is set such that the turning center of the universal joint 55 and the rotation center of the hinge pin 65 are coaxial with each other.

The housing 39 incorporating the main rotation drive shaft 43 and the second rotation drive shafts 47 (A and B) and the brush support bodies 61 (A and B) are respectively provided with spring hooks 67 (A and B) that are located on the side of the straight upper running portion 23U in the band saw blade 23 and are separated from the turning center of the universal joint 55, and tension springs 69 (removing biasing units) are mounted on the spring hooks 67 (A and B).

Figure 11:
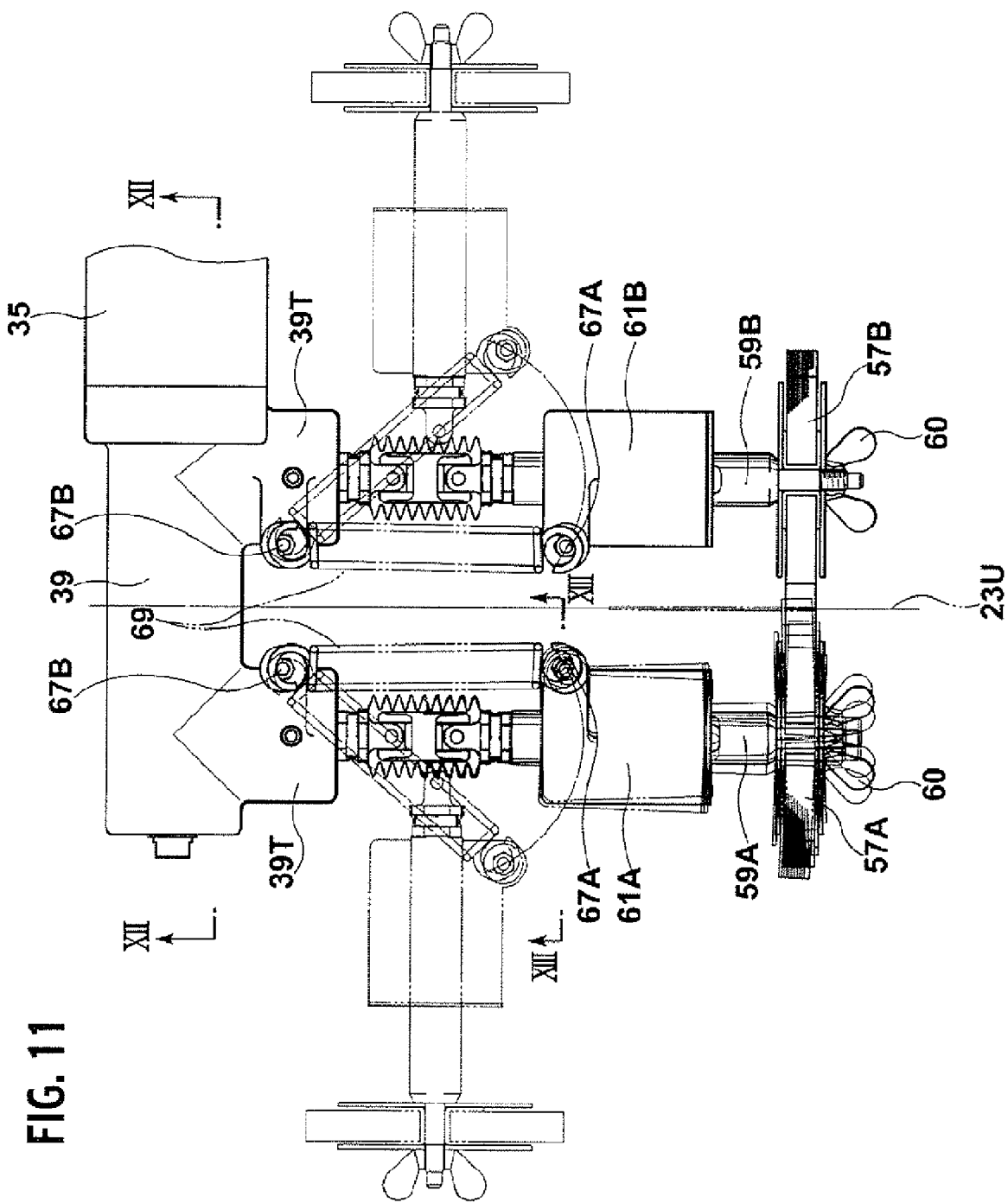
FIG. 11 is a diagram taken along an arrow XI in FIG. 9.
Figure 12:
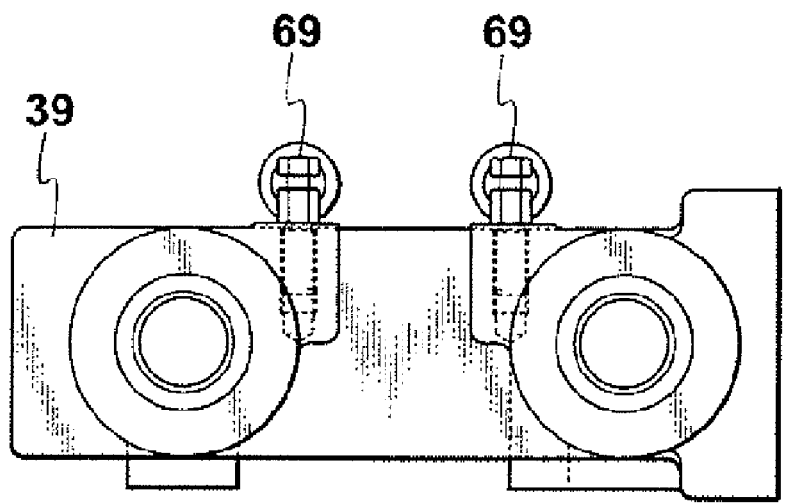
FIG. 12 is a cross section taken along a line XII-XII in FIG. 11.
Figure 13:
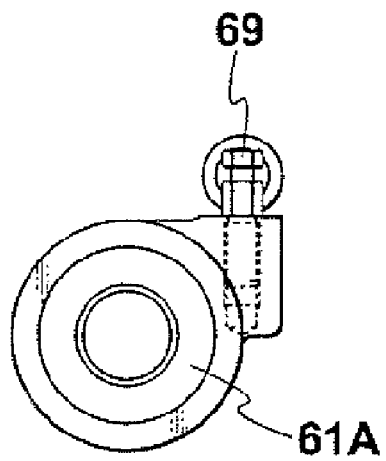
FIG. 13 is a cross section taken along a line XIII-XIII in FIG. 11.

With the above configuration, as shown in FIG. 11, when the tension spring 69 is located substantially in parallel to the band saw blade 23U, biasing force in the clockwise direction and the counterclockwise direction are applied to the brushes 57 (A and B) by the tension springs 69, and the brushes 57 (A and B) are pushed by both side surfaces of the band saw blade 23U with substantially constant force.

When the band saw blade 23 or the brushes 57 (A and B) are to be replaced, if an operator turns the brush support body 61B in the counterclockwise direction against the biasing force in the clockwise direction for example, and if a line passing through the centers of the spring hook 67A and the spring hook 67B exceeds a point (dead center) that passes through the rotation center of the hinge pin 65 of the brush support body 61B, the brush 57B is biased in the clockwise direction and turns to a position shown with phantom lines in FIG. 11, i.e., to a turning permissible range (about 90°) of the universal joint 55, and the brush 57B is held at that position. In the case of the brush 57A, it can easily be understood that the brush 57A is operated in the direction opposite to that of the brush 57B.

Figure 17:
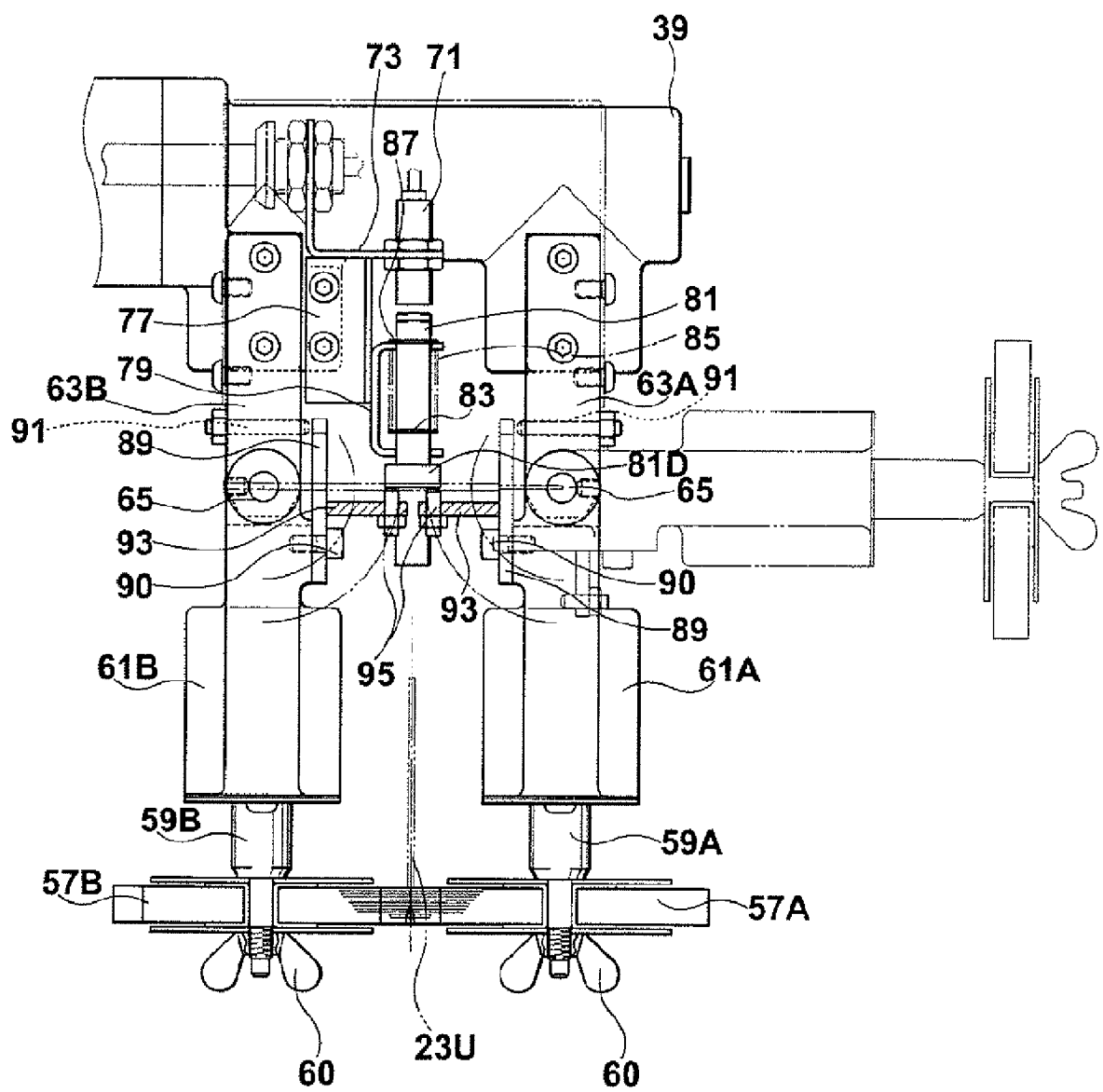
FIG. 17 is a detailed explanatory diagram of a sensor portion shown in FIG. 6.

With reference to FIG. 17, as a sensor that detects wearing states of the brushes 57 (A and B), for example, a proximity sensor 71 is fixed to a sensor bracket 73 fixed to the housing 39 on the side (left side in FIG. 9) of the housing 39 on which the hinge plates 63 (A and B) are mounted.

A to-be detected shaft 81 is pivotally supported by a U-shaped to-be detected shaft support body 79 that is integrally formed on a bracket 77, on the housing 39 such that the to-be detected shaft 81 can turn toward and away from a detector of the proximity sensor 71.

A snap ring 83 is fitted to the to-be detected shaft 81 located inside of a U-shaped portion of the to-be detected shaft support body 79. A compression spring 85 (detecting biasing unit) that biases the to-be detected shaft 81 in a direction away from the detector of the proximity sensor 71 is resiliently provided between the snap ring 83 and the to-be detected shaft support body 79 on the side of the proximity sensor 71.

In the above-described state where the compression spring 85 is resiliently mounted, one end of the to-be detected shaft 81 extends to the position close to the detection range of the proximity sensor 71, and the other end extends to a location outside of the U-shape of the to-be detected shaft support body 79, and the other end includes a dog engaging portion 81D that is greater than a diameter of the to-be detected shaft 81. A snap ring 87 for restricting the returning position of the to-be detected shaft 81 is fitted over the to-be detected shaft 81 that is located outside of the U-shape portion of the to-be detected shaft support body 79.

In the above configuration, the to-be detected shaft 81 is always biased by the compression spring 85 in a direction away from the proximity sensor 71, and the snap ring 87 of the to-be detected shaft 81 engages with the to-be detected shaft support body 79 so that the gap between the to-be detected shaft 81 and the proximity sensor 71 is held at a given value. For example, the gap in this embodiment is held at 3.0 mm.

Stopper members 89 extending in parallel to the second rotation drive shafts 47 (A and B) are fixed to side surfaces of the brush support bodies 61 (A and B) on the side of the band saw blade 23U by bolts 90. Adjusting screws 91 that can abut against ends of the stopper members 89 on the side of the second rotation drive shafts 47 (A and B) are threadedly inserted into the hinge plates 63 (A and B).

The stopper members 89 are respectively integrally provided with pushing levers 93 extending toward the band saw blade 23U. A setscrew 95 engaged with the dog engaging portion 81D of the to-be detected shaft 81 is provided on the pushing lever 93 such that a position of the setscrew 95 can be adjusted.

With this configuration, when one or both of the brushes 57 (A and B) are worn, the brushes 57 (A and B) move toward the band saw blade 23U by the biasing force of the tension spring 69, and at the same time, the setscrew 95 engaged with the dog engaging portion 81D of the to-be detected shaft 81 pushes the to-be detected shaft 81.

With the above-described configuration, the position of the stopper member 89 is appropriately adjusted by the adjusting screw 91, and the pressing force of the brushes 57 (A and B) against the annular band saw blade 23 can be kept and adjusted at a constant value.

The position of the proximity sensor 71 is set such that the gap between the to-be detected shaft 81 and the proximity sensor 71 comes into the detection range when one or both of the brushes 57 (A and B) are worn to their using limit, so that the replacement timing of the brushes 57 (A and B) can automatically be detected.

At the time of the cutting operation, the brushes 57 (A and B) are held at a state in which they are pressed against both sides of the band saw blade 23U by the biasing force of the tension spring 69 under constant pressing force. Therefore, a stopper member for positioning the brush into the chip removing position is not particularly required.

The disclosure of Japanese Patent Application No. 2004-055990 (filed on Mar. 1, 2004) is incorporated by reference herein in their entirety.

The embodiments of the present invention described above are to be considered not restrictive, and the invention can be embodied in other various forms, as changes are appropriately made.

INDUSTRIAL APPLICABILITY

The configuration of the chip removing device in the band saw based on the present invention can be applied to any of the lateral band saw, the vertical band saw, the circular saw, and a hacksaw.

The invention claimed is:

1. A chip removing device in a band saw that removes, using a pair of brushes, chips adhered to a band saw blade that rotates while being wound around a driving wheel and a follower wheel rotatably supported by a saw blade housing, the chip removing device comprising:

a pair of brush support bodies that pivotally support a pair of brush shafts having respectively the pair of brushes that can come into contact with both side surfaces of a blade tip of the band saw blade such that the pair of brush shafts can be rotationally driven;

a driving mechanism having a drive motor, the driving mechanism rotationally driving the pair of brush shafts pivotally supported by the pair of brush support bodies in a manner such that a rotationally moving direction on a side where each of the pair of brushes provided on the pair of the brush shafts comes into contact with the band saw blade is the same direction of the running direction of the band saw blade;

a removing biasing unit that can bias the pair of brush support bodies in a direction approaching the band saw blade and in a direction separating away from the band saw blade; and a wear detector that detects a reduction in diameter of the brush caused by wear, wherein each of the pair of brush support bodies and each of the pair of brush shafts are provided such that they can rock in the direction approaching the band saw blade and in the direction separating away from the band saw blade, each of the pair of brushes is biased toward the band saw blade so that the band saw blade is sandwiched with the pair of brushes, the pair of brush shafts are inclined in a forward and downward direction with respect to the running direction of the band saw blade, each of the pair of brushes is rotated from a blade root side toward a blade tip side of the band saw blade, thereby removing the chips from the band saw blade, and wherein the wear detector comprises:

a pair of pushing levers extending from the pair of brush support bodies toward the band saw blade;

a sensor to detect the wear of the band saw blade;

a shaft to be detected which can be engaged with each of the pushing levers and which can be reciprocated so as to approach the sensor and to be moved away from the sensor; and a detecting biasing unit biasing always the shaft to be detected so that the shaft to be detected is moved away from the sensor and is brought into abutment against the pushing levers, wherein when one or both of the pair of brushes is worn to their using limit, the one or both of the pair of brushes being moved toward the band saw blade by the removing biasing unit and one or both of the pair of pushing levers being engaged with the shaft to be detected, thereby the shaft to be detected is pushed by the pushing levers so as to approach the sensor then the wear for the using limit of the one or both of the pair of brushes can be detected.

2. The chip removing device in the band saw according to claim 1, wherein the driving mechanism comprises:

a pair of drive bevel gears opposed to a shaft end of a main rotation drive shaft that is rotated and driven by the drive motor;

a pair of second rotation drive shafts that are rotated and driven in directions opposite from each other through a pair of follower bevel gears meshing with the pair of drive bevel gears, the pair of second rotation drive shafts intersecting with the main rotation drive shaft at right angles; and a pair of universal joints that connects the pair of second rotation drive shafts and the pair of brush shafts that are pivotally supported by the pair of brush support bodies such that the pair of second rotation drive shafts and the pair of brush shafts can rock in a direction approaching the band saw blade and in a direction separating away from the band saw blade.

3. The chip removing device in the band saw according to claim 2, wherein the removing biasing unit comprises:

spring hooks that are respectively provided on the brush support bodies and a housing incorporating the main rotation drive shafts and the second rotation drive shaft on the side of the band saw blade, and at positions away from a turning center of a respective universal joint; and tension springs that are resiliently provided between the spring hook on the side of the housing and the spring hook on the side of the brush support body.

* * * * *